US010783810B1

(12) United States Patent
Tan

(10) Patent No.: US 10,783,810 B1
(45) Date of Patent: Sep. 22, 2020

(54) ILLUMINATION DISPLAY PLATFORMS AND RELATED METHODS

(71) Applicant: Tectonics Industries, LLC, Auburn Hills, MI (US)

(72) Inventor: Christian Tan, North Las Vegas, NV (US)

(73) Assignee: Tectonics Industries, LLC, Auburn Hills, MI (US)

( * ) Notice: Subject to any disclaimer, the term of this patent is extended or adjusted under 35 U.S.C. 154(b) by 0 days.

(21) Appl. No.: 16/822,963

(22) Filed: Mar. 18, 2020

Related U.S. Application Data

(60) Provisional application No. 62/821,938, filed on Mar. 21, 2019.

(51) Int. Cl.

| | |
|---|---|
| ***G09F 13/04*** | (2006.01) |
| ***G06F 13/22*** | (2006.01) |
| ***F21S 4/28*** | (2016.01) |
| ***F21V 21/096*** | (2006.01) |
| ***F21Y 115/10*** | (2016.01) |
| ***G09F 13/22*** | (2006.01) |

(52) U.S. Cl.
CPC ............ *G09F 13/0404* (2013.01); *F21S 4/28* (2016.01); *F21V 21/096* (2013.01); *G09F 13/22* (2013.01); *F21Y 2115/10* (2016.08); *G09F 2013/222* (2013.01)

(58) Field of Classification Search
CPC ........ G09F 13/0404; G09F 13/22; F21S 4/28; F21V 21/096
USPC ........................................................ 362/555
See application file for complete search history.

(56) References Cited

U.S. PATENT DOCUMENTS

| | | | | |
|---|---|---|---|---|
| 3,917,940 | A * | 11/1975 | Duddy | F21S 6/003 362/398 |
| 4,538,214 | A * | 8/1985 | Fisher | F21V 21/096 362/147 |
| 8,915,609 | B1 * | 12/2014 | Shah | F21V 21/096 362/183 |
| 9,318,886 | B1 * | 4/2016 | Pate | H01R 11/30 |
| 9,548,008 | B1 * | 1/2017 | Manning | H02J 7/0044 |
| 2009/0067165 | A1 * | 3/2009 | Sanoner | F21V 21/096 362/191 |
| 2009/0086478 | A1 * | 4/2009 | Sanroma | H01R 13/6205 362/234 |
| 2009/0239393 | A1 * | 9/2009 | Shah | G05B 15/02 439/40 |
| 2010/0214747 | A1 * | 8/2010 | Jacobs | H05K 3/303 361/729 |
| 2012/0075857 | A1 * | 3/2012 | Verbrugh | F21V 29/73 362/249.01 |
| 2017/0363276 | A1 * | 12/2017 | Chien | F21V 7/0008 |
| 2019/0244551 | A1 * | 8/2019 | Chiang | G09F 13/22 |

* cited by examiner

*Primary Examiner* — Bryon T Gyllstrom
(74) *Attorney, Agent, or Firm* — Panagos Kennedy PLLC; Bill Panagos; Linda Kennedy

(57) ABSTRACT

An illumination display platform is provided. The platform includes an illumination source, like an LED strip, that provides lighting effects in connection with an art element and a panel system when the art element and panel system are in electrical and magnetic communication with one another. The illumination display platform permits tool-free assembly and disassembly.

18 Claims, 6 Drawing Sheets

ILLUMINATION DISPLAY PLATFORMS AND RELATED METHODS

RELATED APPLICATIONS

This disclosure claims the benefit of the priority date of U.S. provisional patent application No. 62/821,938, filed Mar. 21, 2019, incorporated herein in its entirety.

TECHNICAL FIELD

This disclosure relates to easy-to-assemble and disassemble illumination display platforms.

BACKGROUND

Illumination of signage has many applications. Consider the example of conferences, tradeshows, and other large-scale events. There, exhibitors generally seek to use signs that attract attention to distinguish themselves from others. In recent years, some such signs have included illumination to catch the eyes of attendees. For conferences and the like, however, such illuminated signs can be challenging and time consuming to set up and break down. This is because certain electrical illumination configurations involve extensive and intricate wiring arrangements. Additionally, and the mechanical assembly and disassembly of the support structure with the illuminated signs typically involves the use of tools. Additionally, these illuminated signs sometimes leave exhibitors to use curtains, drapes or sheets to hide otherwise exposed fasteners and wiring.

There is a need for an elegant illumination display platform that permits rapid setup and/or breakdown.

BRIEF SUMMARY

An illumination display platform is provided. The platform includes one or more art elements that are removably connectable to a panel system via magnets and contacts. An illumination source is positioned on or near select art elements to provide a lighting effect in connection with at least a part of the art elements and/or the panel system. When the art elements are magnetically connected to contacts receiving power, an electrical circuit is completed. This complete circuit includes an illumination source, which then lights and produces visual effects in connection with the art elements. The panel system may include a frame of mechanically connectable frame sections that can be assembled without tools and without fasteners that would be visible to one viewing an outward facing surface of the panel system.

DETAILED DESCRIPTION

All figures and examples herein are intended to be non-limiting; they are mere exemplary iterations and/or illustrative embodiments of the claims appended to the end of this description. Modifications to specifically-described system, device, the order of steps in processes, etc., are contemplated. The display platforms and assembly methods are capable of other embodiments and of being practiced and carried out in various ways. Also, it is to be understood that the phraseology and terminology employed herein are for the purpose of the description and should not be regarded as limiting. Moreover, discussion of the related art throughout the specification should in no way be considered as an admission that such related art is widely known or forms part of common general knowledge in the field.

Illumination Display Platforms

Generally, illumination display platforms include a panel system and an art element that are magnetically removably connectable to one another, as well as one or more illumination sources positioned on one or both of the panel system and art element.

Figure 1:
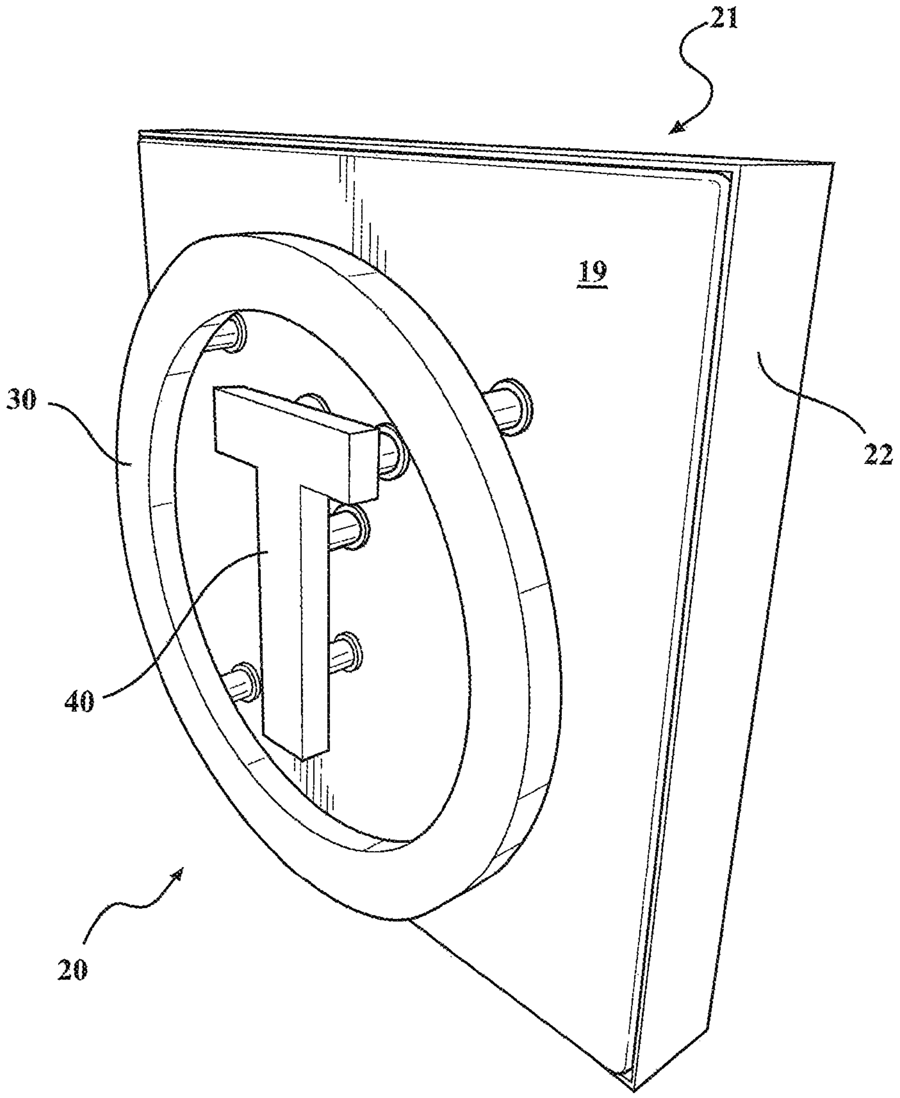
FIG. 1 is perspective view of an exemplary assembled illumination display platform.

Referring to FIG. 1, an exemplary assembled illumination display platform 20 is illustrated. Illumination display platforms 20 may be configured for a wall-mounted application, suspended from a ceiling or other structure, or set in a support structure with legs or a base. Optionally, illumination display platform 20 can be configured as a free-standing structure (e.g., placed directly on a desk or floor). Although drawn as a flat box shape, display platform 20 can be or include nearly any shape, including flat cylindrical type shapes or a non-flat shapes such as a section of spheroid or an irregular shape.

Figure 3:
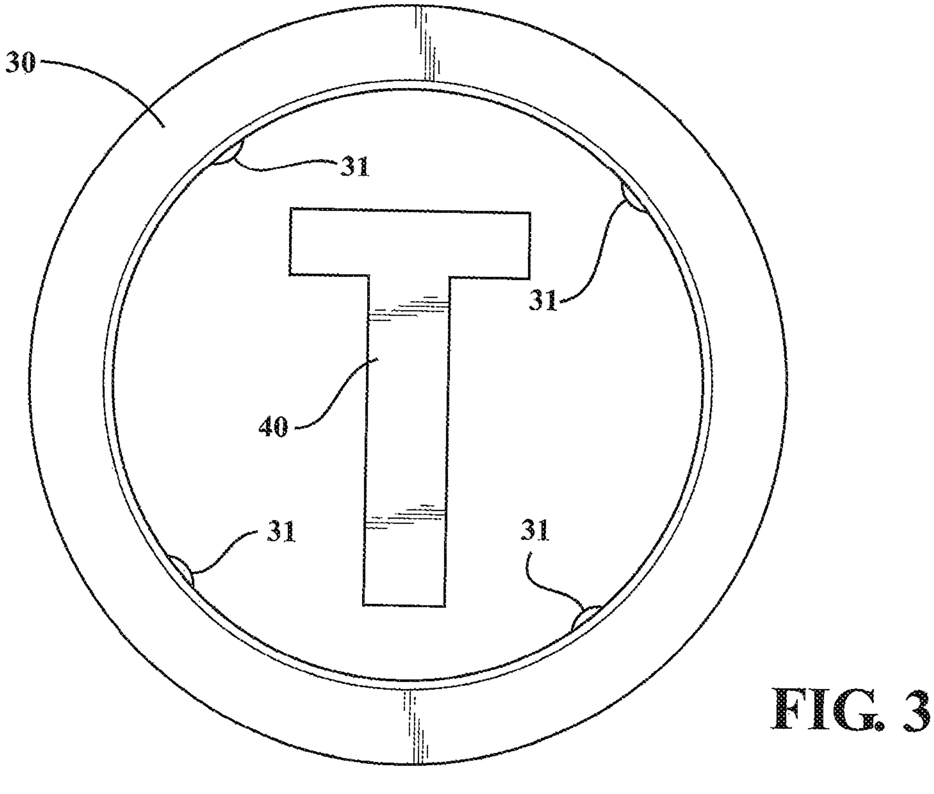
FIG. 3 is a front view of exemplary art elements.
Figure 4:
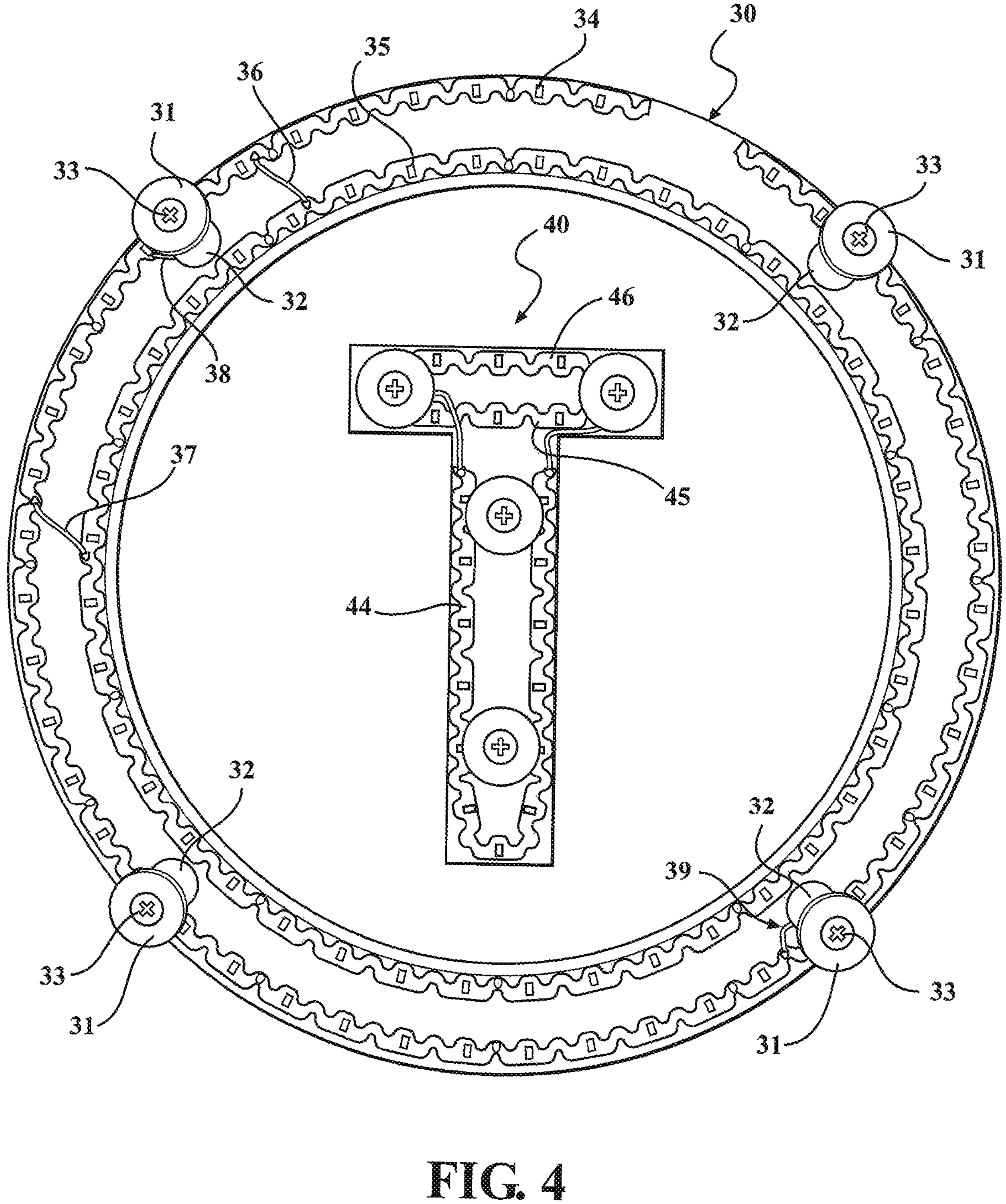
FIG. 4 is a back view of exemplary art elements.

The FIGS. 1 and 3 exemplary illumination display platform 20 includes a panel system 21 with art elements 30 and 40 magnetically connected to the panel system 21, which includes a cover 19 and a frame 22. Here, the magnets 31 are attached to an inward-facing surface of art element 30. Both the panel system 21 and the art elements 30 and 40 have magnetic elements (either contacts or magnets or both), which may be for structural purposes and/or for electrical purposes. For structural purposes, the contacts and magnets are generally at least partially metal and may provide physical strength and/or stability. Part of a magnetic member, for example, may include a screw or other fastener or securement device that is of an electrically conductive material. For electrical purposes, when the art elements 30 and 40 are magnetically secured and power is supplied, this connection closes an electrical circuit. The electrical circuit is configured to provide electrical power to any number of illuminations sources 34, 35, 44, 45, 46 (FIG. 4).

Power may be supplied to contacts by an external source or an on-board source. Electrical current may emanate from a power source in electrical communication with contacts on or in or supported by the panel system 21, such as through apertures 80 in a cover of panel system 21. Power sources may be from any of a number of standard electrical services, including by way of non-limiting example, 120V AC converted to DC to power light emitting diode (LED) lights.

When electrical power is applied, the combination of the relative mounting position between the outward-facing surface of panel system 21 and the art elements 30 and 40, and the placement and use of selected illumination sources, may cause visually pleasing lighting effects in the illumination display platform 20. For example, a stand-off distance between the outward-facing surface of panel system 21 and the art elements 30 and 40 may be selected to achieve a variety of lighting effects.

In addition to the visually pleasing lighting effects, the display platform 20 may have an enhanced aesthetic appeal due to the absence of visible wiring, switches, connectors, fasteners and/or other conventional accessories.

Panel System

Generally, panel systems include a mounting plate and mounted electrical components, at least one magnetic element to attach to an art element, and a cover and frame. Certain contemplated configurations may not include one or more of a cover or a frame.

Figure 2:
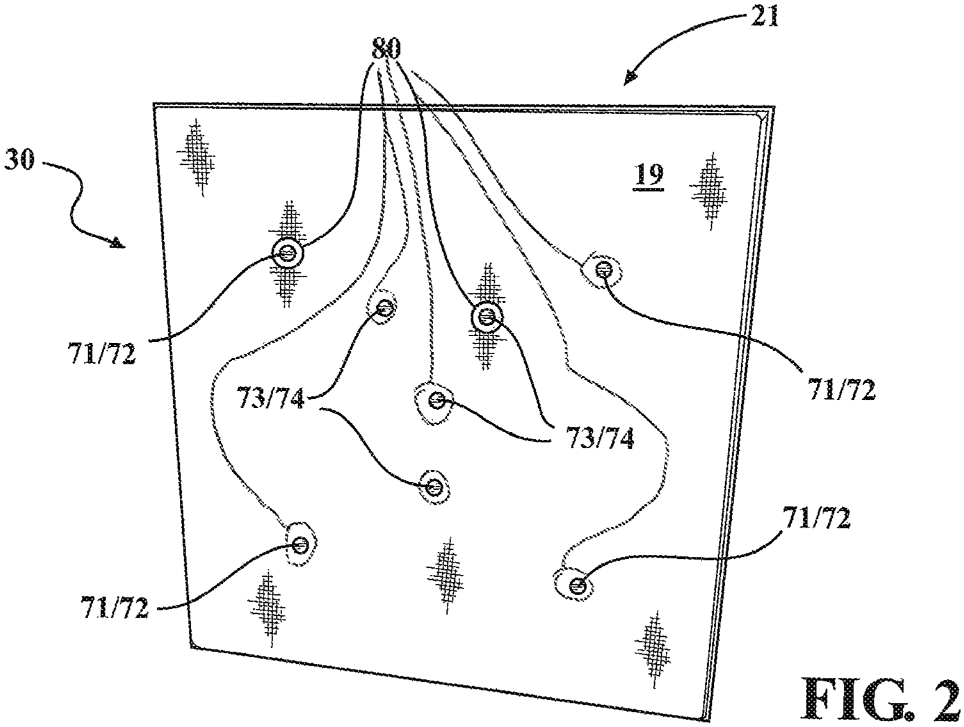
FIG. 2 is a front view an exemplary covered panel system.

Referring to FIG. 2, a front view of panel system 21 with cover 19 is shown prior to mounting any art elements or subsequent to removing any art elements. Panel systems 21 need not be flat nor rectangular, other shapes and configurations are contemplated as described with reference to illumination display platforms 20, above. Panel system 21 may include apertures 80 in cover 19 to permit surface contact between the contacts 71, 72, 73, 74 of the panel system and their respective magnetic and electrical counterparts that are affiliated with art elements. Apertures 80 are wide of the contacts in FIG. 2 to illustrate the concept, but apertures 80 may sized and shaped to more closely fit the contacts 71, 72, 73, and 74 in a given installation. Contacts may comprise any material or combination of materials that is electrically conductive and that is connectable to a magnet. Various numbers of contacts and sizes of contacts are contemplated. Configurations are also contemplated where panel system 21 includes one or more magnets that interact with complementary contacts on art elements.

Cover 19 is shown as an outward facing surface of panel system 21. Covers may comprise any number of materials, including fabric (woven or non-woven), glass, or plastic. In the illustrated embodiment, cover 19 comprises dye-sublimated tension fabric. Whether or not including cover, the outward-facing surface of panel system 21 may be optionally be coated for any number of purposes, such as UV protection, sheen, gloss, texture, color, waterproofing, etc. Covers may be secured as part of panel system 21 in any of a number of ways, including mechanical and chemical attachment mechanisms. One non-limiting way to attach a fabric cover is by using a silicone edge graphic bead (SEG) adhesive in an SEG channel provided in a mounting plate or frame or combination of both.

Figure 7:
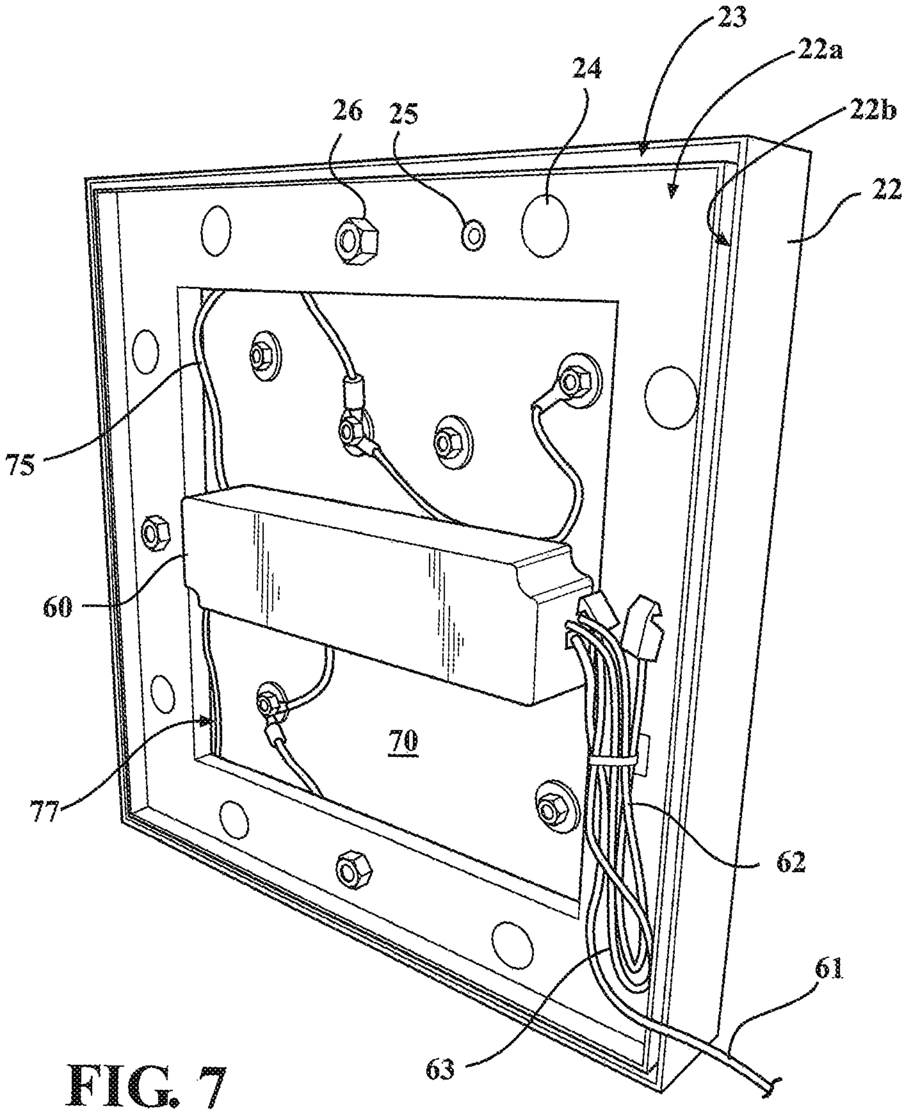
FIG. 7 is a back perspective view of an uncovered panel system.
Figure 8:
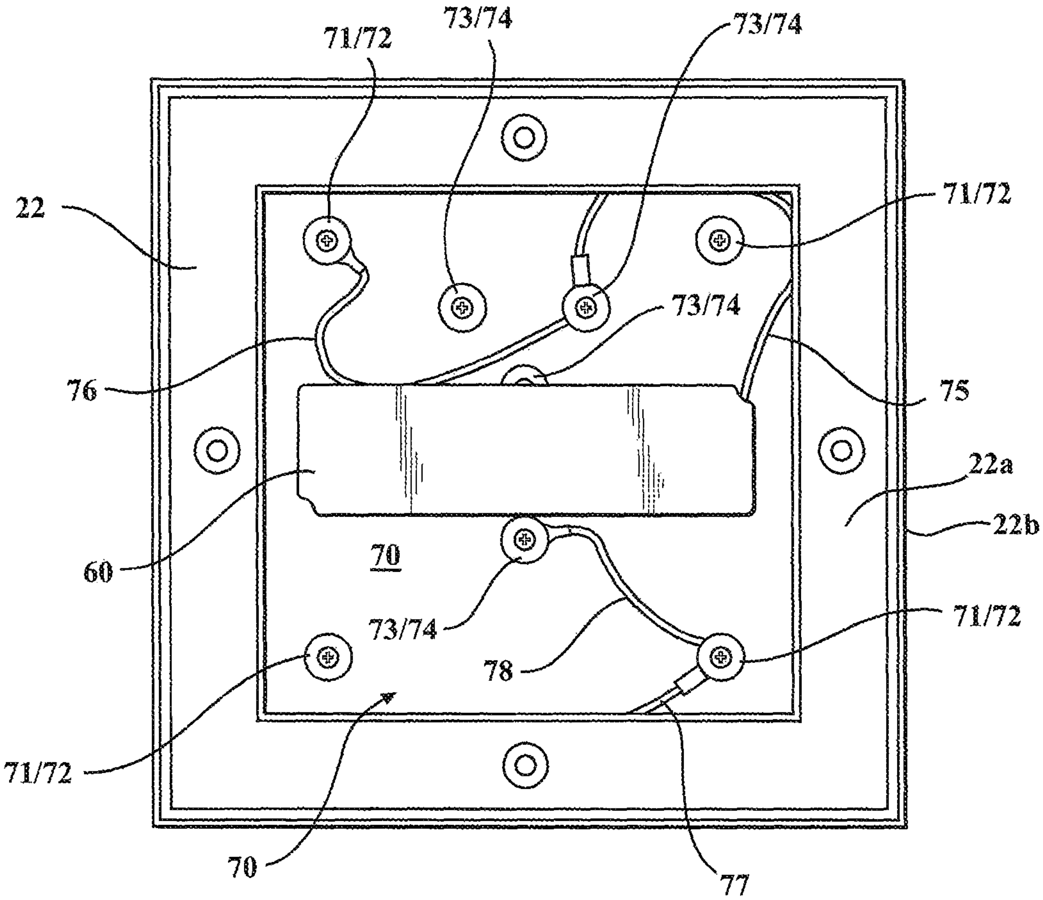
FIG. 8 is a front view of an exemplary uncovered panel system.

FIGS. 7 and 8 show uncovered views of an example panel system 21. Structure is provided to accommodate a cover. Cover 19 (not shown) is securable to panel system 21 via silicone edge graphic bead (SEG) adhesive in channel 23. Other mechanical and chemical attachment mechanisms are contemplated. Depending upon installation configuration of display platform 20, an inward-facing surface of panel system 21 may not call for a cover. For example, if the display platform 20 is intended for wall installation, aesthetic demands would not require a back cover. By contrast, FIG. 8 is outward-facing, and as such, would likely be covered by some coating or material, plastic or fabric, for example, for aesthetic purposes.

Referring to FIGS. 7 and 8, mounting plate 70 is secured in frame 22. Light weight, sturdy and easy to handle materials may be desirable for the mounting plate 70 and frame 22, which may be of the same or a different material. By way of non-limiting example, mounting plate 70 and frame 22 may comprise metal, plastic, and/or wood. Aluminum extrusions are suitable, as well as acrylics, impact modified acrylics and polycarbonate sheets. Acrylic plexiglass sheets may also be useful, such as light diffusion (LD) sheets.

Referring to FIG. 7, a single panel system 21 is secured in frame 22 using fasteners 26. In some embodiments, frame 22 may be adapted to host a plurality of panel systems 21 with outward-facing surfaces in different directions. Frame 22 is shown as rectangular but can be in any of a number of shapes and sizes, depending upon the particular installation of an illumination display platform 20. In the illustrated embodiment, frame 22 is an aluminum extrusion that comprises a plurality of frame sections **22*a* and 22*b* that are mechanically connectable to each other without tools and, optionally, without separate connectors or fasteners or with a reduced number of connectors or fasteners relative to conventional signage supports. In the illustrated embodiment, one or more buttons 24 can be pressed to attach complementary male/female componentry, channel-lock mechanisms, tongue-in-groove systems, or spring-bias connections. Here, frame section 22*a* engages with frame section 22*b* via channel-lock mechanism to form the frame 22. For additional securement, hardware keys 25 or other easy to use tool-free connectors may be employed to lock or provide additional support for the mechanical connection. Some versions of the illustrated embodiment of frame 22** include internal channels formed integrally with frame sections during extrusion. Such channels may be useful for wire routing or insertion of foams or adhesives or other materials.

In FIGS. 7 and 8, an exemplary way of supporting the electrical componentry in or on panel system 21 and/or frame 22 is illustrated and described briefly in this paragraph and in more detail in other sections of the disclosure. Power cord 61 is connectable to an external power source. Alternatively, embodiments using on-board power sources such as batteries are contemplated. Power cord 61 is in electrical communication with rectifier 60 and contacts 71, 72, 73, 74. As drawn, AC power inputs 62 and 63 (in electrical communication with power cord 61) provide electrical input to rectifier 60. Rectifier 60 then outputs positive DC power in wire 75 and negative DC power in wire 77. Positive DC wire 75 is routed to select contact 73 (view of connection obstructed). From there, a positive DC traveler wire 76 is routed and to contact 71. Negative DC power in wire 77 is routed to contact 71. From there, a negative DC traveler wire 78 is routed to contact 73. In this way, when power is on and the magnetic connection at the contacts is made with art elements, an electrical circuit that includes electrical communication with illumination sources is complete. Then illumination commences and persists until art elements are removed or power cord 61 is unplugged. Alternative wiring configurations and other electrical communication mechanisms are contemplated.

Art Elements

Generally, art elements may be nearly nay decorative object. Art elements include at least one magnetic element to attach to a panel system, an illumination source and a stand-off member. In certain contemplated configurations, one or more of the illumination source and stand-off member may be supported by the panel system rather than the art elements.

Referring to FIGS. 3-6, different views of exemplary art elements 30 and 40 are illustrated. In FIG. 3, the art elements 30 and 40 are made of wood and painted white form a circle around a letter "T." A given illumination display platform 20 may have one or more art elements, and such elements may be of nearly any shape, size, color and material. Contemplated art elements include but are not limited to 3D and near-2D logos, letters, numbers, product images, award symbols, pictures, and other imagery. Contemplated materials include but are not limited to individual and combinations of metal, ceramics, rubber, plastic, wood, stone, glass, woven and/or non-woven fabric, and porous materials. Art elements may also be coated for functional and/or aesthetic purposes.

As illustrated in FIGS. 3-6, art elements 30 and 40 include magnets 31 and 41, respectively. Nearly any type of magnet may be suitable for use in this application. Rare earth magnets, ceramic magnets are each contemplated in rings as shown or other shapes such as bars or strips. The term magnets and magnetic members, as used broadly and interchangeably herein, to include uniform stand-alone magnets or compound structures that collectively have magnetic and electrical properties, such as the illustrated embodiment of a screw plus magnet that act together to support a magnetic and electrical element. The illustrated embodiment also shows the art element 30 attached with illumination sources 34 and 35 and stand-off members 32 and 42. Similarly, art element 40 is attached with illumination sources 44, 45 and 46 and stand-off member 42. In embodiments where the art element includes contacts, the art elements may be in electrical communication with a power source internal to the art elements, such as an on-board battery system.

Illumination sources may include light emitting diodes (LEDs) in any suitable carrier, such as the illustrated LED strips. Generally, LEDs run at a relatively cool temperature and produce little infrared or ultraviolet light, which may alter certain fabrics or color applications. Other suitable illumination sources may include halogen, incandescent, laser, fluorescent and CFL lighting sources. A wide range of colors and brightness/intensities are contemplated.

Stand-off members provide a distance between the illumination sources and the panel system 21. Stand-off members can be made of nearly any material, and may be static in height at a predetermined height or adjustable within a range of predetermined dimensions. In the depicted embodiment, the stand-off members are acrylic cylinders. The length of the stand-off members creates different light effects. A shorter length may provide an art element with a backlight, and little to no halo effect. As length is increased, the backlight may fade and a halo glow effect around a some or all of a perimeter of an art element may appear. As length continues to increase, a point is reached at which the halo effect and backlight effect fade until diminished. It is contemplated that certain variables would impact the effect. Front-lighting and through-lighting is also contemplated for use with different art elements of different light transmission/absorption/reflection properties. Similarly, panel system covers may include materials having different light transmission/absorption/reflection properties. Additional reflective surfaces, including foils and mirrors, may be included on the panel and/or on the art element to create different visual effects or amplify certain effects. Light barriers may be added near illumination sources for shadowing effects. It is contemplated that lighting effects may target entire art elements, or one or more portions thereof.

Art elements 30 and 40 can be placed and stored in their predetermined orientation and position onto the panel system 21 when the panel system 21 is not powered. When this occurs, the art elements 30 and 40 will audibly snap into place as their respective magnetic connectors join magnetically with their counterpart magnets on the substrate. Magnets capable of high power connections are suitable in the disclosed apparatuses.

Example Configuration

Figure 6:
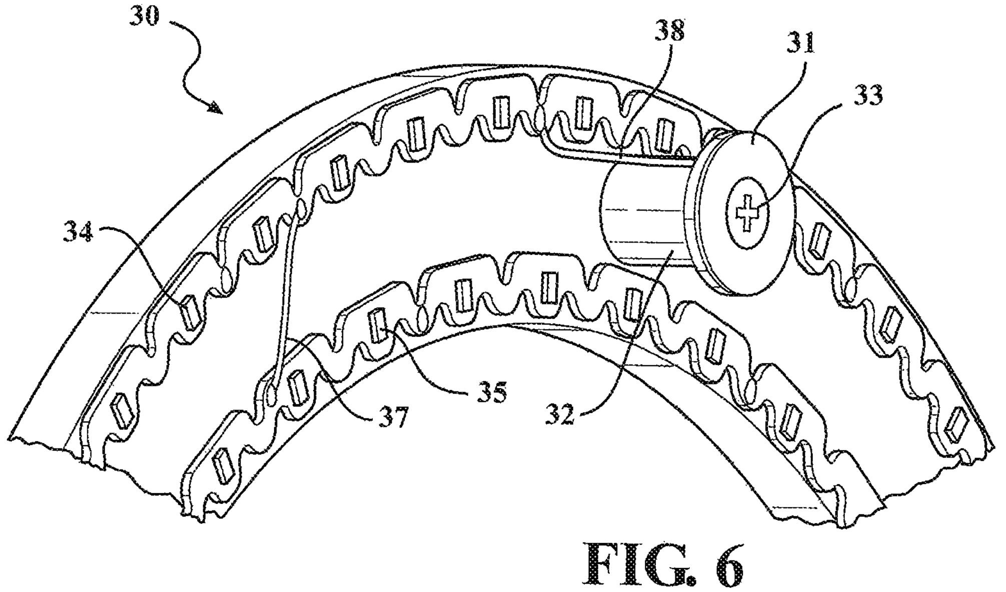
FIG. 6 is a partial back perspective view of an exemplary art element.

FIGS. 4 and 6 show LED strips as illumination sources 34 and 35 attached to an inward-facing surface of art element 30. There are illustrated as two LED strips. One LED strip is positioned near an outer diameter of art element 30, while the other LED strip is positioned near an inner diameter of the art element 30. Both LED strips are mounted with an adhesive, but other mounting devices and techniques are contemplated.

FIGS. 4 and 6 also illustrate one possible electrical connection between illumination sources 34 and 35. In this example, a negative terminal of the outer LED strip of illumination source 34 is connected to a corresponding negative terminal of inner LED strip of illumination source 35 via a connecting wire 36 in electrical communication with the magnet 31 components that also serve as electrical contacts (the components also include metallic screw 33). Similarly, a positive terminal of the outer LED strip of illumination source 34 is connected to a corresponding positive terminal of inner LED strip of illumination source 35 via a connecting wire 37 in electrical communication with the magnet 31 components that also serves as an electrical contact. The number, type and configuration of electrical bridge connectors may vary across different embodiments.

Electrical communication of positive DC current may be achieved by soldering a connecting wire to bridge a discrete magnet 31 with a positive terminal on the LED light strip. Similarly, to achieve a mechanism for transmission of negative DC current, a connecting wire 39 may bridge a different discrete magnet 31 with a negative terminal on the LED light strip. In this manner, there are two separate magnetic components that correspond to the positive and negative sides of the LED light circuit.

Figure 5:
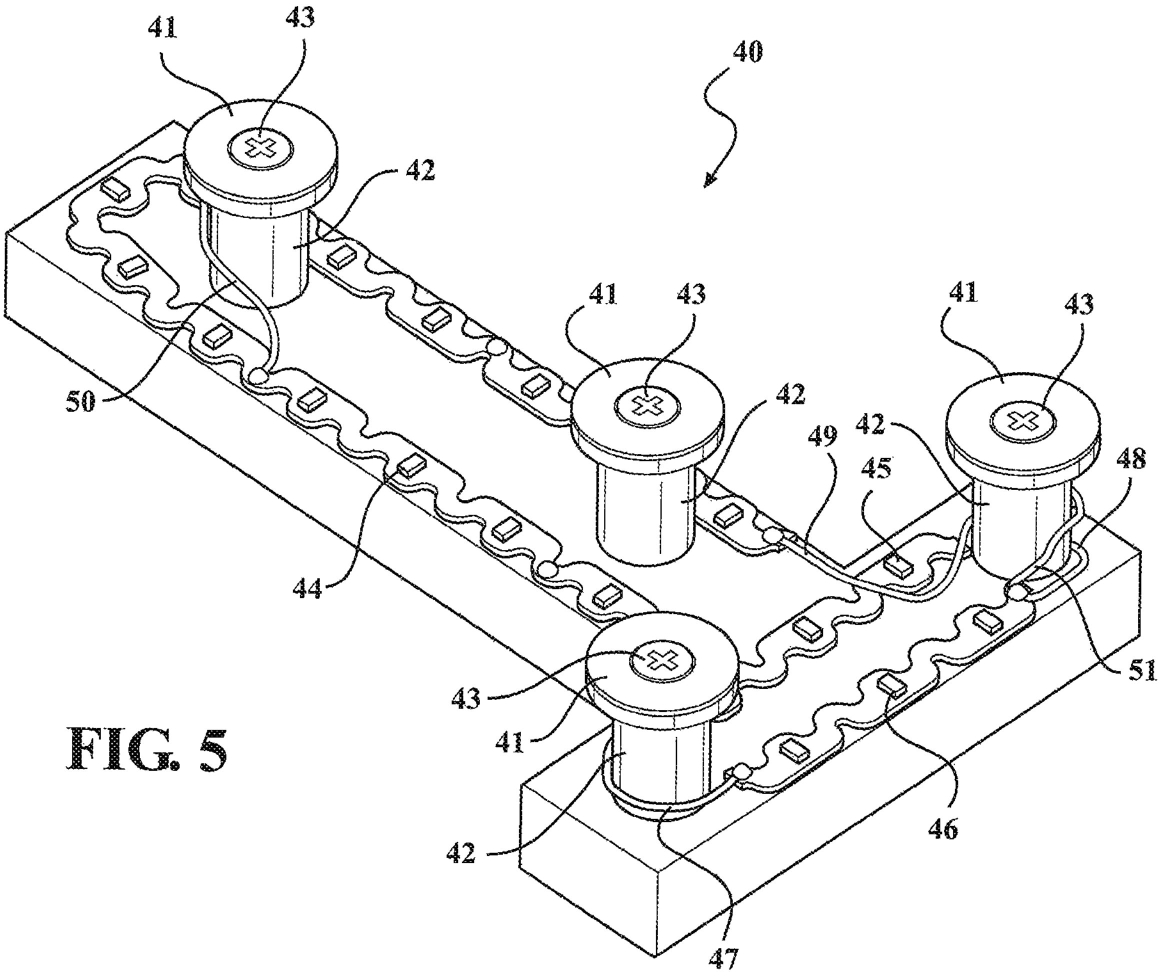
FIG. 5 is a back perspective view of an exemplary art element.

FIG. 5 shows LED light strips as illumination sources 44, 45, and 46 attached to a 3D "T" letter structure, which is an exemplary art element 40. The LED strips are attached to an inward-facing surface of art element 40 and are positioned, generally, along at least a portion of the perimeter of the art element 40. Illumination source 44 is on the surface that comprises the bottom of the "T" shape, while the other illumination sources 45 and 46 are positioned on the top bar of the "T" shape. As drawn, all three illumination sources are mounted flush to the inward facing surface of the 3D "T" shape surface with adhesive. It is contemplated that the type and configuration of illumination configurations may vary. For example, a singular LED strip could be used instead of bridging three different LED strips.

FIG. 5 also shows how illumination source 44 is in electrical communication with illumination sources 45 and 46. As illustrated, negative terminal of the illumination source 44 is connected to a corresponding negative terminal of both illumination sources 45 and 46 via soldering a connecting wire 47 across contacts for each of the three LED strips. Similarly, a positive terminal of the illumination source 44 is connected to corresponding positive terminals of both illumination sources 45 and 46 via soldering a connecting wire 48 across contacts each of the three LED strips. The number, type and configuration of electrical bridge connectors may vary across different embodiments.

The illuminating sources relating to art element 40 receive power externally in the illustrated embodiment. Connectivity for the transmission of positive DC current may be achieved by using a connecting wire 51 to bridge a discrete magnet 41 component (that also includes metallic screw 43) with a positive terminal on an LED light strip. Similarly, to achieve a mechanism for transmission of negative DC current, a connecting wire 50 may bridge a different discrete magnet 41 with a negative terminal on the LED light strip. In this manner, there are two separate magnetic connectors 41 that correspond to the positive and negative sides of the LED light circuit.

Once an electrical circuit is complete via magnetic attachment of the art elements 30 and/or 40 to panel system 21 and external power is applied, illumination of the illumination sources 34, 35, 44 and 46 is achieved, producing a halo visual effect. If the electrical circuit is caused to become open (e.g., by removing an art element 30 or 40 from the panel system 21), then power to respective illumination sources will be cut off and illumination will cease.

In the illustrated embodiment, each of the art elements 30 and 40 have a connection to both a positive DC power source and a negative DC power source. Positive DC wire 75 is routed to a discrete magnetic connector 73 that corresponds upon connection with a magnet 41 that is hosting wire connecting wire 51. From there, a positive DC traveler wire 76 is routed and attached to a discrete connector 71 that corresponds upon connection with a magnet 31 that is hosting wire bridge positive lead 38.

Analogously, negative DC wire 77 is routed first to a discrete connector 71 that will correspond upon connection with a magnet 31 that is hosting wire bridge negative lead 39. From there, a negative DC traveler wire 78 is routed and attached to a discrete connector 73 that corresponds upon connection with a magnet 41 that is hosting wire bridge negative connecting wire 50.

Other electrical configurations are contemplated. As an example, when using AC electrical power directly to the illumination sources on the art elements, there is no need to specify positive or negative.

Assembly & Disassembly Example

Illumination display platforms 20 are easy to assemble and disassemble. Generally, it can be done without tools and without complex wire routing.

An assembler may insert or otherwise secure a mounting plate into a first frame section if not already inserted, and optionally further secure it with an adhesive or mechanical fastener. An assembler may, without tools, mechanically lock a second frame section to the first section, creating a framed panel system that includes channels for wire routing and other purposes. The lock may be a simple snap fit, and may be activated by pressure or a push button. Additional tool-free securements may lock the frame for additional strength and stability. The assembler can wire the system so that the contacts on the mounting plate are adapted to be in electrical communication with a power source. The assembler may, if it has not already been done, attach a cover to the outward-facing surface of the panel system thereby causing the cover to become the outward facing surface of the panel system.

The assembler can prepare the art elements if not already prepared, This may involve attaching a magnetic member, stand-off member, and illumination source to the art element. The magnetic member (illustrated as magnet held by screw) will be in electrical communication with the illumination source. The assembler can attach the art elements to the panel system, and then turn on power. When power is on (an internal or external power source has been activated) and magnetic and electrical contact between the art element and the panel system is made, an illumination source lights. The illumination source stays lit until the art element is removed or the power is turned off.

Taking apart the frame of an illumination display platform requires engaging a button or otherwise applying force to separate frame sections. No tools are required for separating the frame sections from one another. Taking the art elements off requires no disassembly effort other than to overpower the magnet holding the art elements in place. The assembler may store the art elements on the panel system if so desired because the magnetic force holds the art elements in position when power is off.

With regard to the processes described herein, it should be understood that, although the steps of such processes, have been described as occurring in a certain sequence, such processes could be practiced with the described steps performed in an order other than the exemplary order. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined with reference to the appended claims along with the full scope of equivalents to which such claims are entitled. It is anticipated and intended that future developments will occur, and that the disclosed systems and processes will be incorporated into such future embodiments. The invention is capable of modification and variation.

All terms used in the claims are intended to be given their broadest reasonable constructions and their ordinary meanings as understood by those knowledgeable in the technologies described herein unless an explicit indication to the contrary is made herein. Use of the singular articles such as "a," "the," "said," recite one or more of the indicated elements unless a claim recites an explicit limitation to the contrary.

What is claimed as new and desired to be protected by Letters Patent of the United States is:

1. An illumination display platform, comprising:

a) an art element;

b) an illumination source attached directly or indirectly to the art element; and c) a panel system;

wherein at least one of the art element or the panel system includes a magnetic member and at least the other of the art element or the panel system includes an electrically conductive material that is magnetically removably attachable to the magnetic member;

wherein a magnetic connection between the art element and the panel system are also at least a portion of a closed electrical circuit including the illumination source when power is supplied to the illumination display platform, and the display platform further comprising a stand-off member between the art element and an outward-facing surface of the panel system, the stand-off member having dimensions such that the distance between the art element and the illumination source create a backlight effect to the art element and create a halo-effect glow effect around at least a portion of a perimeter of the art element.

2. The illumination display platform of claim 1, wherein the illumination source comprises at least one of LED lights, halogen lights, or incandescent lights.

3. The illumination display platform of claim 1, wherein the stand-off member is connected to the art element, and wherein the illumination source is connected to the art element.

4. The illumination display platform of claim 1, further comprising an on-board power source.

5. The illumination display platform of claim 1, configured for electrical communication with an external power source.

6. The illumination display platform of claim 1, wherein the panel system comprises a mounting plate in a frame, the panel system further including a cover on an outward facing surface of the panel system.

7. The illumination display platform of claim 6, wherein the frame comprises at least one of metal, plastic, or wood.

8. The illumination display platform of claim 6, wherein the frame comprises a plurality of frame sections that are removably mechanically attachable to one another without tools or separate mechanical connectors.

9. The illumination display platform of claim 6, wherein the frame comprises a plurality of frame sections that are removably mechanically attachable to one another via snap action or push-button lock.

10. The illumination display platform of claim 6, wherein the frame supports two panels, each panel having an outward-facing surface magnetically connectable to an art element.

11. The illumination display platform of claim 6, wherein the frame comprises channels for wire routing.

12. The illumination display platform of claim 1, wherein the art element is a 3D object or a near-2D object.

13. An illumination display platform, comprising:

a) an art element;

b) an illumination source attached directly or indirectly to the art element; and c) a panel system including a mounting plate in a frame and a cover on an outward facing surface of the panel system;

wherein at least one of the art element or the panel system includes a magnetic member and at least the other of the art element or the panel system includes an electrically conductive material that is magnetically removably attachable to the magnetic member;

wherein a magnetic connection between the art element and the panel system are also at least a portion of a closed electrical circuit including the illumination source when power is supplied to the illumination display platform; and wherein the frame comprises a plurality of frame sections that are removably mechanically attachable to one another without tools or separate mechanical connectors.

14. The illumination display platform of claim 13, wherein comprises at least one of LED lights, halogen lights, or incandescent lights.

15. The illumination display platform of claim 13, wherein the frame comprises channels for wire routing.

16. An illumination display platform, comprising:

a) an art element;

b) an illumination source attached directly or indirectly to the art element; and c) a panel system including a mounting plate in a frame and a cover on an outward facing surface of the panel system;

wherein at least one of the art element or the panel system includes a magnetic member and at least the other of the art element or the panel system includes an electrically conductive material that is magnetically removably attachable to the magnetic member;

wherein a magnetic connection between the art element and the panel system are also at least a portion of a closed electrical circuit including the illumination source when power is supplied to the illumination display platform; and wherein the frame comprises a plurality of frame sections that are removably mechanically attachable to one another via snap action or push-button lock.

17. The illumination display platform of claim 16, wherein comprises at least one of LED lights, halogen lights, or incandescent lights.

18. The illumination display platform of claim 16, wherein the frame comprises channels for wire routing.

* * * * *